[12] United States Patent
Qin et al.

(10) Patent No.: US 11,640,313 B2
(45) Date of Patent: May 2, 2023

(54) DEVICE UPGRADE METHOD AND APPARATUS

(71) Applicant: HUAWEI TECHNOLOGIES CO., LTD., Guangdong (CN)

(72) Inventors: Cunxiu Qin, Shanghai (CN); Yajun He, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 266 days.

(21) Appl. No.: 16/860,275

(22) Filed: Apr. 28, 2020

(65) Prior Publication Data
US 2020/0257550 A1 Aug. 13, 2020

Related U.S. Application Data

(63) Continuation of application No. PCT/CN2018/111703, filed on Oct. 24, 2018.

(30) Foreign Application Priority Data

Nov. 7, 2017 (CN) .......................... 201711085247.8

(51) Int. Cl.
G06F 9/455 (2018.01)
G06F 9/50 (2006.01)

(52) U.S. Cl.
CPC ........ G06F 9/45558 (2013.01); G06F 9/5027 (2013.01); G06F 9/5077 (2013.01); *G06F 2009/4557* (2013.01); *G06F 2009/45595* (2013.01); *G06F 2209/5011* (2013.01)

(58) Field of Classification Search
None
See application file for complete search history.

(56) References Cited

U.S. PATENT DOCUMENTS

| 9,952,888 | B2* | 4/2018 | Dowlatkhah | ....... G06F 9/44505 |
| 10,530,708 | B2* | 1/2020 | Kim | .................... H04L 41/0897 |
| 10,606,637 | B2* | 3/2020 | Liu | ........................... G06F 1/12 |
| 10,628,195 | B2* | 4/2020 | Miller | ................. H04L 41/0896 |

(Continued)

FOREIGN PATENT DOCUMENTS

| CN | 105975330 A | 9/2016 |
| CN | 106209402 A | 12/2016 |

(Continued)

OTHER PUBLICATIONS

WO20160705594A1_English_translated.pdf; pp. 1-13; "WO2016070559A1—Method and Apparatus for elastic scaling of vnf" (Year: 2016).*

(Continued)

*Primary Examiner* — Hiren P Patel
(74) *Attorney, Agent, or Firm* — WHDA, LLP

(57) ABSTRACT

Embodiments of the present disclosure provide a device upgrade method and apparatus. Both NFVI (network functions virtualisation infrastructure) resources used to create a target VNFC (virtualised network function component) and NFVI resources used to scale out/up the target VNFC are fewer than those occupied by a to-be-upgraded VNFC; or both the NFVI resources used to create the target VNFC and the NFVI resources used to scale out/up the target VNFC are fewer than those required for upgrading the to-be-upgraded VNFC.

17 Claims, 2 Drawing Sheets

(56) References Cited

U.S. PATENT DOCUMENTS

| | | | |
|---|---|---|---|
| 10,795,715 B2* | 10/2020 | Ahmad | G06F 11/0712 |
| 10,798,018 B2* | 10/2020 | Yousaf | G06F 9/5077 |
| 10,942,761 B2* | 3/2021 | Asayag | G06F 9/45558 |
| 11,036,536 B2* | 6/2021 | Wang | G06F 9/45558 |
| 11,070,541 B2* | 7/2021 | Liu | H04L 63/0823 |
| 11,099,869 B2* | 8/2021 | Zembutsu | G06F 9/46 |
| 11,411,821 B2* | 8/2022 | Guo | G06F 8/65 |
| 11,481,249 B2* | 10/2022 | Li | G06F 9/45558 |
| 2016/0335111 A1* | 11/2016 | Bruun | H04L 43/0817 |
| 2017/0017512 A1* | 1/2017 | Csatari | G06F 9/45558 |
| 2017/0054565 A1* | 2/2017 | Feng | H04L 9/3263 |
| 2017/0250870 A1* | 8/2017 | Zhao | H04L 63/20 |
| 2017/0279735 A1* | 9/2017 | Yousaf | G06F 9/5083 |
| 2018/0011730 A1* | 1/2018 | Zembutsu | H04L 41/0836 |
| 2018/0309824 A1* | 10/2018 | Gkellas | G06F 9/45558 |
| 2019/0132211 A1* | 5/2019 | Yeung | H04L 41/0896 |
| 2019/0245750 A1* | 8/2019 | Banda | H04L 41/0893 |
| 2020/0012510 A1* | 1/2020 | Andrianov | G06F 9/45558 |
| 2020/0084091 A1* | 3/2020 | Iovene | H04L 47/781 |
| 2021/0149699 A1* | 5/2021 | Celozzi | G06F 9/5027 |
| 2021/0288827 A1* | 9/2021 | Celozzi | H04L 41/5029 |
| 2021/0344611 A1* | 11/2021 | Sakata | H04L 41/342 |

FOREIGN PATENT DOCUMENTS

| | | | | |
|---|---|---|---|---|
| CN | 106301828 A | 1/2017 | | |
| CN | 106506186 A | 3/2017 | | |
| CN | 107209709 A | 9/2017 | | |
| EP | 3038291 A1 | 6/2016 | | |
| WO | 2015/126430 A1 | 8/2015 | | |
| WO | 2016/048430 A1 | 3/2016 | | |
| WO | WO-2016070559 A1 * | 5/2016 | | H04L 41/00 |
| WO | 2017/071169 A1 | 5/2017 | | |
| WO | 2017142577 A1 | 8/2017 | | |

OTHER PUBLICATIONS

Marotta et al.; "A fast robust optimization-based heuristic for the deployment of green virtual network functions"; Journal of Network and Computer Applications; (Marotta_2017.pdf; pp. 42-53) (Year: 2017).*

Zarrar et al.; "Fine-Grained Resource-Aware Virtual Network Function Management for 5G Carrier Cloud"; IEEE 2016; (Zarrar_2016.pdf; pp. 110-115) (Year: 2016).*

International Search Report dated Jan. 29, 2019, issued in counterpart application No. PCT/CN2018/111703, with English translation. (13 pages).

Extended (Supplementary) European Search Report dated Oct. 29, 2020 issued in counterpart EP application No. 18875942.7. (9 pages).

Office Action dated Feb. 1, 2021, issued in counterpart CN Application No. 201711085247.8, with English translation. (12 pages).

* cited by examiner

DEVICE UPGRADE METHOD AND APPARATUS

CROSS-REFERENCE TO RELATED APPLICATIONS

This application is a continuation of International Application No. PCT/CN2018/111703, filed on Oct. 24, 2018, which claims priority to Chinese Patent Application No. 201711085247.8, filed on Nov. 7, 2017, the disclosures of the aforementioned applications are hereby incorporated by reference in their entireties.

TECHNICAL FIELD

This application relates to the communications field, and in particular, to a device upgrade method and apparatus.

BACKGROUND

As a network functions virtualization (NFV) technology continuously develops, more operators have started to use network functions virtualization infrastructure (NFVI) provided by a cloud-based platform to construct a network system.

In a network system constructed by using the NFV technology, a virtualized network function manager (VNFM) may create, based on a function to be implemented in the network system, a corresponding virtualized network function component (VNFC) by using the NFVI, to replace a conventional physical network device.

For example, in a wireless communications system, both a serving GPRS (General Packet Radio Service) support node (serving GPRS support node, SGSN) and a mobility management entity (MME) may be VNFCs created by the VNFM by using the NFVI. The VNFM creates the corresponding VNFC based on the function to be implemented in the network system, so that the NFVI provided by the cloud-based platform can be fully used, and unnecessary resource waste is reduced.

Because telecommunications technologies are continuously upgraded, and user requirements keep changing, a telecommunications operator also needs to continuously upgrade the VNFC. To avoid service interruption during an upgrade of an earlier conventional VNFC, an active/standby switchover manner is usually used. When the earlier VNFC is upgraded in the active/standby switchover manner, the VNFM needs to first configure a new VNFC as a standby VNFC of the earlier VNFC, next back up a service of the earlier VNFC to the new VNFC, then switch an active/standby relationship between the new VNFC and the earlier VNFC, and finally disable the earlier VNFC, to implement the upgrade of the VNFC.

However, during the upgrade of the earlier VNFC, if the active/standby switchover manner is used, the VNFM needs to first create the new VNFC by using NFVI. NFVI resources used to create the new VNFC are not fewer than those used by the earlier VNFC. Therefore, the cloud-based platform needs to reserve a large quantity of NFVI resources to upgrade the VNFC. Consequently, the NFVI provided by the cloud-based platform cannot be fully used.

SUMMARY

The present disclosure provides a device upgrade method and apparatus, to resolve a technical problem of comparatively low NFVI resource utilization.

According to a first aspect of the embodiments of the present disclosure, a device upgrade method is provided. The method includes:

creating a target VNFC by using an initial NFVI resource, where the target VNFC includes at least one target virtual machine, and NFVI resources occupied by the target VNFC are fewer than those occupied by a to-be-upgraded VNFC;

migrating a service carried by a first to-be-migrated virtual machine group to the target virtual machine and/or a second to-be-migrated virtual machine group, where the first to-be-migrated virtual machine group includes some virtual machines in the to-be-upgraded VNFC, and the second to-be-migrated virtual machine group includes a virtual machine in the to-be-upgraded VNFC except the first to-be-migrated virtual machine group;

releasing an NFVI resource occupied by the first to-be-migrated virtual machine group;

performing a first scale-out/up on the target VNFC by using an NFVI resource in a resource pool, where the resource pool includes an NFVI resource obtained by releasing the first to-be-migrated virtual machine group; and migrating a service carried by the second to-be-migrated virtual machine group to a target VNFC obtained after the first scale-out/up.

In an optional implementation, the performing a first scale-out/up on the target VNFC by using an NFVI resource in a resource pool includes:

adding, to the target VNFC, a new virtual machine created by using the NFVI resource in the resource pool; or expanding a capacity of a virtual machine in the target VNFC by using the NFVI resource in the resource pool.

In an optional implementation, the adding, to the target VNFC, a new virtual machine created by using the NFVI resource in the resource pool includes:

adding the new virtual machine to the target VNFC, where the new virtual machine is a virtual machine created by using the NFVI resource obtained by releasing the first to-be-migrated virtual machine group.

In an optional implementation, the expanding a capacity of a virtual machine in the target VNFC by using the NFVI resource in the resource pool includes:

expanding the capacity of the virtual machine in the target VNFC by using the NFVI resource obtained by releasing the first to-be-migrated virtual machine group.

In an optional implementation, the migrating a service carried by the second to-be-migrated virtual machine group to a target VNFC obtained after the first scale-out/up includes:

migrating a service carried by an $i^{th}$ virtual machine in the second to-be-migrated virtual machine group to a target VNFC obtained after an $i^{th}$ scale-out/up;

releasing an NFVI resource occupied by the $i^{th}$ virtual machine;

performing an $(i+1)^{th}$ scale-out/up on the target VNFC by using an $(i+1)^{th}$ available NFVI resource, where the $(i+1)^{th}$ available NFVI resource includes an NFVI resource obtained by releasing the $i^{th}$ virtual machine;

migrating a service carried by an $(i+1)^{th}$ virtual machine in the second to-be-migrated virtual machine group to a target VNFC obtained after the $(i+1)^{th}$ scale-out/up; and releasing an NFVI resource occupied by the $(i+1)^{th}$ virtual machine until all services carried by the second to-be-migrated virtual machine group are migrated to the target VNFC, where $i=1, 2, 3, \ldots, N-1, N$; and N is a quantity of virtual machines included in the second to-be-migrated virtual machine group.

In an optional implementation, the migrating a service carried by a first to-be-migrated virtual machine group to the target virtual machine and/or a second to-be-migrated virtual machine group includes:

migrating, based on a migration granularity of each service carried by the first to-be-migrated virtual machine group, each service carried by the first to-be-migrated virtual machine group.

In an optional implementation, the migrating a service carried by the second to-be-migrated virtual machine group to a target VNFC obtained after the first scale-out/up includes:

migrating, based on a migration granularity of each service carried by the second to-be-migrated virtual machine group, each service carried by the second to-be-migrated virtual machine group.

According to a second aspect of the embodiments of the present disclosure, a device upgrade apparatus is provided. The apparatus includes:

a creation unit, configured to create a target VNFC by using an initial NFVI resource, where the target VNFC includes at least one target virtual machine, and NFVI resources occupied by the target VNFC are fewer than those occupied by a to-be-upgraded VNFC;

a first migration unit, configured to migrate a service carried by a first to-be-migrated virtual machine group to the target virtual machine and/or a second to-be-migrated virtual machine group, where the first to-be-migrated virtual machine group includes some virtual machines in the to-be-upgraded VNFC, and the second to-be-migrated virtual machine group includes a virtual machine in the to-be-upgraded VNFC except the first to-be-migrated virtual machine group;

a first release unit, configured to release an NFVI resource occupied by the first to-be-migrated virtual machine group;

a first scale-out/up unit, configured to perform a first scale-out/up on the target VNFC by using an NFVI resource in a resource pool, where the resource pool includes an NFVI resource obtained by releasing the first to-be-migrated virtual machine group; and a second migration unit, configured to migrate a service carried by the second to-be-migrated virtual machine group to a target VNFC obtained after the first scale-out/up.

In an optional implementation, the first scale-out/up unit includes:

an adding unit, configured to add, to the target VNFC, a new virtual machine created by using the NFVI resource in the resource pool; or a second scale-up unit, configured to expand a capacity of a virtual machine in the target VNFC by using the NFVI resource in the resource pool.

In an optional implementation, the adding unit is specifically configured to add the new virtual machine to the target VNFC, where the new virtual machine is a virtual machine created by using the NFVI resource obtained by releasing the first to-be-migrated virtual machine group.

In an optional implementation, the second scale-up unit is specifically configured to expand the capacity of the virtual machine in the target VNFC by using the NFVI resource obtained by releasing the first to-be-migrated virtual machine group.

In an optional implementation, the second migration unit includes:

a third migration unit, configured to migrate a service carried by an $i^{th}$ virtual machine in the second to-be-migrated virtual machine group to a target VNFC obtained after an $i^{th}$ scale-out/up;

a second release unit, configured to release an NFVI resource occupied by the $i^{th}$ virtual machine;

a third scale-out/up unit, configured to perform an $(i+1)^{th}$ scale-out/up on the target VNFC by using an $(i+1)^{th}$ available NFVI resource, where the $(i+1)^{th}$ available NFVI resource includes an NFVI resource obtained by releasing the $i^{th}$ virtual machine; a fourth migration unit, configured to migrate a service carried by an $(i+1)^{th}$ virtual machine in the second to-be-migrated virtual machine group to a target VNFC obtained after the $(i+1)^{th}$ scale-out/up; and a third release unit, configured to release an NFVI resource occupied by the $(i+1)^{th}$ virtual machine until all services carried by the second to-be-migrated virtual machine group are migrated to the target VNFC, where i=1, 2, 3, . . . , N−1, N; and N is a quantity of virtual machines included in the second to-be-migrated virtual machine group.

In an optional implementation, the first migration unit is specifically configured to migrate, based on a migration granularity of each service carried by the first to-be-migrated virtual machine group, each service carried by the first to-be-migrated virtual machine group.

In an optional implementation, the second migration unit is specifically configured to:

migrate, based on a migration granularity of each service carried by the second to-be-migrated virtual machine group, each service carried by the second to-be-migrated virtual machine group.

According to a third aspect of the embodiments of the present disclosure, a computer-readable storage medium is provided. The computer-readable storage medium includes an instruction, and when the instruction runs on a computer, the computer is enabled to perform the device upgrade method according to the first aspect.

According to a fourth aspect of the embodiments of the present disclosure, a computer program product is provided. When the computer program product runs on a computer, the computer is enabled to perform the device upgrade method according to the first aspect.

According to a fifth aspect of the embodiments of the present disclosure, a device is provided. The device includes a memory, a processor, and a computer program that is stored in the memory and that can run on the processor. When executing the program, the processor implements the device upgrade method according to the first aspect.

In this application, the target VNFC is first created by using initial NFVI resources, where the initial NFVI resources may be fewer than NFVI resources required for upgrading the to-be-upgraded VNFC, or may be fewer than NFVI resources occupied by the to-be-upgraded VNFC, and the NFVI resources occupied by the target VNFC are fewer than those occupied by the to-be-upgraded VNFC; the service carried by the first to-be-migrated virtual machine group is migrated to a first transit virtual machine, where the first transit virtual machine includes the virtual machine in the target VNFC or a virtual machine in the second to-be-migrated virtual machine group; the NFVI resource occupied by the first to-be-migrated virtual machine group is released; the first scale-out/up is performed on the target VNFC by using a first available NFVI resource, where the first available NFVI resource may include the NFVI resource obtained by releasing the first to-be-migrated virtual machine group; and the service carried by the second to-be-migrated virtual machine group is migrated to the target VNFC obtained after the first scale-out/up.

In this application, both NFVI resources used to create the target VNFC and NFVI resources used to scale out/up the target VNFC are fewer than those occupied by the to-be-upgraded VNFC; or both the NFVI resources used to create the target VNFC and the NFVI resources used to scale out/up the target VNFC are fewer than those required for upgrading the to-be-upgraded VNFC. Therefore, in this application, a same quantity of NFVI resources as those occupied by the to-be-upgraded VNFC do not need to be reserved in NFVI resources provided by a cloud-based platform, to upgrade the to-be-upgraded VNFC, and only NFVI resources fewer than those occupied by the to-be-upgraded VNFC need to be reserved to upgrade the to-be-upgraded NFVC, so that more NFVI resources provided by the cloud-based platform can be used to scale out/up the to-be-upgraded VNFC, the virtual machine in the to-be-upgraded VNFC can carry more services to externally provide more services, and NFVI resource utilization is improved.

DESCRIPTION OF EMBODIMENTS

After researching NFV technologies, the inventors find that a VNFC, especially a VNFC corresponding to a core network node, created by a VNFM by using an NFVI resource, usually includes a plurality of virtual machines (virtual machine, VM), the VMs are independent of each other, and each VM is used to carry a service. Therefore, after researching a VNFC in a wireless communications network system, the inventors find that, when an earlier VNFC is upgraded, a service carried by VMs in the earlier VNFC may be migrated to a new VNFC in batches. For a specific procedure, refer to an embodiment shown in FIG. 1.

Figure 1:
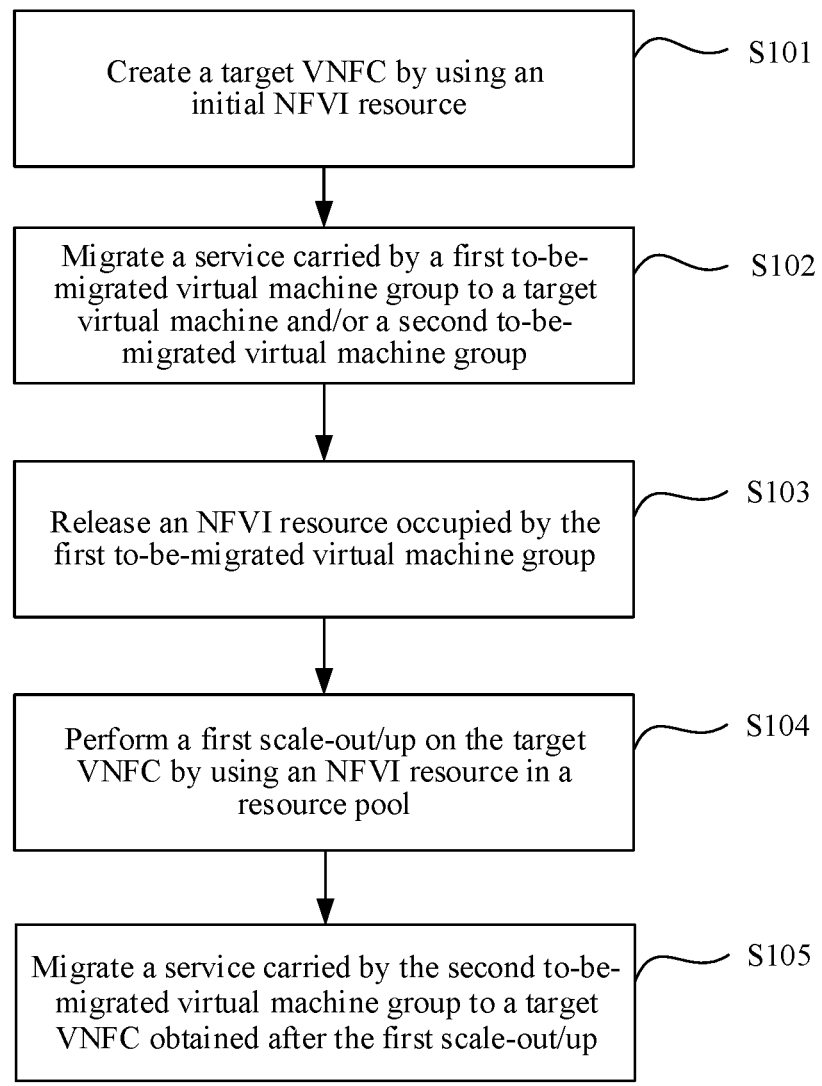
FIG. 1 is a flowchart of a device upgrade method according to an example embodiment.

FIG. 1 is a flowchart of a device upgrade method according to an example embodiment. As shown in FIG. 1, the method may be performed by an SMC (Service Management Center). The SMC may be a virtual device constructed by a VNFM by using an NFVI resource. The method may include the following steps.

Step 101: Create a target VNFC by using an initial NFVI resource.

Initial NFVI resources may be NFVI resources provided by a cloud-based platform to upgrade a to-be-upgraded VNFC. The initial NFVI resources may be fewer than NFVI resources required for upgrading the to-be-upgraded VNFC, or may be fewer than NFVI resources occupied by the to-be-upgraded VNFC.

The SMC may first create the target VNFC by using the initial NFVI resource provided by the cloud-based platform, and then perform step 102. The target VNFC includes at least one target virtual machine, and NFVI resources occupied by the target VNFC are fewer than those occupied by the to-be-upgraded VNFC.

For example, it is assumed that the cloud-based platform provides seven units of NFVI resources, and four units of NFVI resources have been used to create the to-be-upgraded VNFC. The remaining three units of NFVI resources are not used, and the remaining three units of NFVI resources are the initial NFVI resources. The SMC may use one unit, two units, or three units of NFVI resources in the remaining three units of NFVI resources to create the target VNFC, provided that NFVI resources used to create the target VNFC are fewer than those occupied by the to-be-upgraded VNFC or those required for upgrading the to-be-upgraded NFVC.

Step 102: Migrate a service carried by a first to-be-migrated virtual machine group to the target virtual machine and/or a second to-be-migrated virtual machine group.

In this application, virtual machines in the to-be-upgraded VNFC may be divided into two groups, where one group may be referred to as the first to-be-migrated virtual machine group, and the other group may be referred to as the second to-be-migrated virtual machine group.

The first to-be-migrated virtual machine group may include at least one virtual machine, the second to-be-migrated virtual machine group may also include at least one virtual machine, and the first to-be-migrated virtual machine group includes no virtual machine in common with the second to-be-migrated virtual machine group.

The first to-be-migrated virtual machine group includes some virtual machines in the to-be-upgraded VNFC.

In this application, the service carried by the first to-be-migrated virtual machine group may be migrated to the target virtual machine; or the service carried by the first to-be-migrated virtual machine group may be migrated to the second to-be-migrated virtual machine group; or one part of the service carried by the first to-be-migrated virtual machine group may be migrated to the target virtual machine, and the other part of the service carried by the first to-be-migrated virtual machine group may be migrated to the second to-be-migrated virtual machine group.

In this application, for any service, if one virtual machine in a VNFC can independently carry the service, the virtual machine in the VNFC may be used to carry the service; if one virtual machine in the VNFC cannot independently carry the service, a plurality of virtual machines in the VNFC are required to carry the service. When receiving a service processing request for processing the service, the VNFC processes the service carried by the virtual machine in the VNFC.

A service processing request is received only by a corresponding VNFC. Each VNFC has processing permission only on a service carried by a virtual machine in the VNFC, but does not have processing permission on a service carried by a virtual machine in another VNFC. In other words, each VNFC can process only a service carried by a virtual machine in the VNFC, but cannot process a service carried by a virtual machine in another VNFC.

If the service is carried by a plurality of virtual machines, the plurality of virtual machines need to be located in a same VNFC. Therefore, when the service needs to be processed, the VNFC can process the service carried by each virtual machine in the VNFC, that is, can completely process the service, and can externally provide normal services for the service. Otherwise, the VNFC cannot completely process the service, and cannot externally provide normal services for the service.

For example, it is assumed that the to-be-upgraded VNFC includes two virtual machines: a virtual machine 1 and a virtual machine 2, and a service is carried by the virtual machine 1 and the virtual machine 2. In other words, the virtual machine 1 carries one part of the service, and the virtual machine 2 carries the other part of the service.

When the to-be-upgraded VNFC receives a service processing request for the service, because both the virtual machine 1 and the virtual machine 2 are located in the to-be-upgraded VNFC, the to-be-upgraded VNFC can not only process the part of the service carried by the virtual machine 1, but also process the other part of the service carried by the virtual machine 2, that is, can completely process the service, and can externally provide normal services for the service.

However, it is assumed that the service is carried by the virtual machine 1 and a virtual machine 3. In other words, the virtual machine 1 carries one part of the service, and the virtual machine 3 carries the other part of the service, and the virtual machine 3 is located in another VNFC, such as the target VNFC.

When the to-be-upgraded VNFC receives the service processing request for the service, because the virtual machine 3 is not located in the to-be-upgraded VNFC, the to-be-upgraded VNFC can process only the part of the service carried by the virtual machine 1, but cannot process the other part of the service carried by the virtual machine 3, so that the to-be-upgraded VNFC cannot completely process the service, and cannot externally provide normal services for the service.

Similarly, when the target VNFC receives the service processing request for the service, because the virtual machine 1 is not located in the target VNFC, the target VNFC can process only the other part of the service carried by the virtual machine 3, but cannot process the part of the service carried by the virtual machine 1, so that the target VNFC cannot completely process the service, and cannot externally provide normal services for the service.

It can be learned that when the service is carried by the virtual machine 1 and the virtual machine 3, neither the to-be-upgraded VNFC nor the target VNFC can completely process the service, and can externally provide normal services for the service.

Therefore, in this application, at any moment in a process of migrating the service from the to-be-upgraded VNFC to the target VNFC, it needs to be ensured that the service is carried by virtual machines in a same VNFC. In other words, at any moment, virtual machines that carry the service are virtual machines in the to-be-upgraded VNFC or virtual machines in the target VNFC.

Therefore, when a virtual machine in the first to-be-migrated virtual machine group carries one part of the service, and a virtual machine in the second to-be-migrated virtual machine group carries the other part of the service, it needs to be determined whether the virtual machine in the second to-be-migrated virtual machine group can further carry the part of the service carried by the first to-be-migrated virtual machine group.

If the virtual machine in the second to-be-migrated virtual machine group can further carry the part of the service carried by the first to-be-migrated virtual machine group, for example, if a capacity required by the part of the service carried by the first to-be-migrated virtual machine group is less than or equal to an idle capacity of the virtual machine in the second to-be-migrated virtual machine group, the part of the service carried by the first to-be-migrated virtual machine group may be first migrated to the second to-be-migrated virtual machine group. In this way, all virtual machines that carry the service are located in the to-be-upgraded VNFC. Therefore, the to-be-upgraded VNFC can continue to completely process the service, and can externally provide normal services for the service.

If the virtual machine in the second to-be-migrated virtual machine group cannot carry the part of the service carried by the first to-be-migrated virtual machine group, for example, if a capacity required by the part of the service carried by the first to-be-migrated virtual machine group is greater than an idle capacity of the virtual machine in the second to-be-migrated virtual machine group, a standby virtual machine may be created in the to-be-upgraded VNFC, the created standby virtual machine is used as a virtual machine in the second to-be-migrated virtual machine group, and the part of the service carried by the first to-be-migrated virtual machine group is first migrated to the standby virtual machine. In this way, all virtual machines that carry the service are located in the to-be-upgraded VNFC. Therefore, the to-be-upgraded VNFC can continue to completely process the service, and can externally provide normal services for the service.

In this application, if each service carried by a virtual machine in the first to-be-migrated virtual machine group is independently carried by the virtual machine in the first to-be-migrated virtual machine group, the service carried by the virtual machine in the first to-be-migrated virtual machine group may be directly migrated to a virtual machine in the target VNFC.

Step 103: Release an NFVI resource occupied by the first to-be-migrated virtual machine group.

In this application, after the service carried by the first to-be-migrated virtual machine group is migrated from the first to-be-migrated virtual machine group, the NFVI resource occupied by the first to-be-migrated virtual machine group may be released.

Step 104: Perform a first scale-out/up on the target VNFC by using an NFVI resource in a resource pool.

The resource pool may include an NFVI resource obtained by releasing the first to-be-migrated virtual machine group, or the resource pool may include the NFVI resource obtained by releasing the first to-be-migrated virtual machine group and an idle NFVI resource left after the target VNFC is created by using the initial NFVI resource.

For example, it is assumed that the cloud-based platform provides seven units of NFVI resources, and four units of NFVI resources have been used to create the to-be-upgraded VNFC, where the first to-be-migrated virtual machine group in the to-be-upgraded VNFC occupies two units of NFVI resources, and the second to-be-migrated virtual machine group occupies the other two units of NFVI resources. Two units of NFVI resources are used to create the target VNFC in step 101. After the service carried by the first to-be-migrated virtual machine group is migrated from the first to-be-migrated virtual machine group, a virtual machine in the first to-be-migrated virtual machine group may be released, and two units of idle NFVI resources are obtained.

In this case, the seven units of NFVI resources include the two units of NFVI resources occupied by the second to-be-migrated virtual machine group, the two units of NFVI resources occupied by the target VNFC, one unit of NFVI resource that is not used after the target VNFC is created, and the two units of NFVI resources obtained after the virtual machine in the first to-be-migrated virtual machine group is released.

Therefore, the resource pool includes three units of NFVI resources in total, namely, the two units of NFVI resources obtained after the virtual machine in the first to-be-migrated virtual machine group is released and the one unit of NFVI resource that is not used after the target VNFC is created.

If the resource pool includes the two units of NFVI resources obtained after the virtual machine in the first to-be-migrated virtual machine group is released, any one or two of the two units of NFVI resources may be used to perform the first scale-out/up on the target VNFC in this step.

If the resource pool includes the one unit of NFVI resource that is not used after the target VNFC is created and the two units of NFVI resources obtained after the virtual machine in the first to-be-migrated virtual machine group is released, any one, two, or three of the three units of NFVI resources may be used to perform the first scale-out/up on the target VNFC in this step.

In this application, the first scale-out/up performed on the target VNFC by using the NFVI resource in the resource pool may be implemented in the following two manners:

In one manner, a new virtual machine created by using the NFVI resource in the resource pool is added to the target VNFC. Specifically, the new virtual machine is added to the target VNFC, where the new virtual machine is a virtual machine created by using the NFVI resource obtained by releasing the first to-be-migrated virtual machine group.

In the other manner, a capacity of a virtual machine in the target VNFC is expanded by using the NFVI resource in the resource pool. Specifically, the capacity of the virtual machine in the target VNFC is expanded by using the NFVI resource obtained by releasing the first to-be-migrated virtual machine group. In this manner, a quantity of virtual machines in the target VNFC is not increased, but a bearer capability of the virtual machine in the target VNFC is increased.

Step 105: Migrate a service carried by the second to-be-migrated virtual machine group to a target VNFC obtained after the first scale-out/up.

In this application, if the target VNFC obtained after the first scale-out/up can carry all services carried by the second to-be-migrated virtual machine group, all services carried by the second to-be-migrated virtual machine group may be migrated, at a time, to the target VNFC obtained after the first scale-out/up, to implement an upgrade of the to-be-upgraded VNFC. Further, an NFVI resource occupied by the second to-be-migrated virtual machine group is released.

In this application, if the target VNFC obtained after the first scale-out/up cannot carry all services carried by the second to-be-migrated virtual machine group, all services carried by the second to-be-migrated virtual machine group may be migrated to the target VNFC in batches.

Specifically, a service carried by an $i^{th}$ virtual machine in the second to-be-migrated virtual machine group may be migrated to a target VNFC obtained after an $i^{th}$ scale-out/up; an NFVI resource occupied by the $i^{th}$ virtual machine in the second to-be-migrated virtual machine group is released; an $(i+1)^{th}$ scale-out/up is performed on the target VNFC by using an $(i+1)^{th}$ available NFVI resource, where the $(i+1)^{th}$ available NFVI resource includes an NFVI resource obtained by releasing the $i^{th}$ virtual machine; a service carried by an $(i+1)^{th}$ virtual machine is migrated to a target VNFC obtained after the $(i+1)^{th}$ scale-out/up; and an NFVI resource occupied by the $(i+1)^{th}$ virtual machine in the second to-be-migrated virtual machine group is released until all services carried by the second to-be-migrated virtual machine group are migrated to the target VNFC, where i=1, 2, 3, . . . , N−1. N is a quantity of virtual machines included in the second to-be-migrated virtual machine group.

Further, an NFVI resource occupied by an $N^{th}$ virtual machine in the second to-be-migrated virtual machine group is released.

In this application, the target VNFC is first created by using the initial NFVI resources, where the initial NFVI resources may be fewer than the NFVI resources required for upgrading the to-be-upgraded VNFC, or may be fewer than the NFVI resources occupied by the to-be-upgraded VNFC, and the NFVI resources occupied by the target VNFC are fewer than those occupied by the to-be-upgraded VNFC; the service carried by the first to-be-migrated virtual machine group is migrated to a first transit virtual machine, where the first transit virtual machine includes the virtual machine in the target VNFC or a virtual machine in the second to-be-migrated virtual machine group; the NFVI resource occupied by the first to-be-migrated virtual machine group is released; the first scale-out/up is performed on the target VNFC by using a first available NFVI resource, where the first available NFVI resource may include the NFVI resource obtained by releasing the first to-be-migrated virtual machine group; and the service carried by the second to-be-migrated virtual machine group is migrated to the target VNFC obtained after the first scale-out/up.

In this application, both the NFVI resources used to create the target VNFC and NFVI resources used to scale out/up the target VNFC are fewer than those occupied by the to-be-upgraded VNFC; or both the NFVI resources used to create the target VNFC and the NFVI resources used to scale out/up the target VNFC are fewer than those required for upgrading the to-be-upgraded VNFC. Therefore, in this application, a same quantity of NFVI resources as those occupied by the to-be-upgraded VNFC do not need to be reserved in NFVI resources provided by the cloud-based platform, to upgrade the to-be-upgraded NFVC, and only NFVI resources fewer than those occupied by the to-be-upgraded VNFC need to be reserved to upgrade the to-be-upgraded NFVC, so that more NFVI resources provided by the cloud-based platform can be used to scale out/up the to-be-upgraded VNFC, the virtual machine in the to-be-upgraded VNFC can carry more services to externally provide more services, and NFVI resource utilization is improved.

For example, it is assumed that the cloud-based platform provides 10 units of NFVI resources.

In the prior art, it needs to be ensured that reserved NFVI resources are more than or equal to NFVI resources occupied by an earlier VNFC. In other words, in the prior art, the earlier VNFC can occupy a maximum of five units of NFVI resources.

Upgrading an earlier VNFC that occupies five units of NFVI resources is used as an example. In the prior art, a new VNFC having a same size as the earlier VNFC needs to be created by using the remaining five units of NFVI resources, and a service carried by a virtual machine in the earlier VNFC is migrated to a virtual machine in the new VNFC at a time. Then the five units of NFVI resources occupied by the virtual machine in the earlier VNFC are released for a next upgrade of the new VNFC.

However, if the earlier VNFC occupies six units of NFVI resources, only four units of NFVI resources in the 10 units of NFVI resources remain idle. According to an upgrade method in the prior art, a new VNFC having a same size as the earlier VNFC cannot be created by using the four units of NFVI resources, and the earlier VNFC cannot be upgraded. Therefore, when the earlier VNFC can occupy a maximum of five units of NFVI resources, a capacity of the earlier VNFC is limited, so that the earlier VNFC can carry only a limited quantity of services, and cannot externally provide more services.

However, according to the method in this application, it does not need to be ensured that the reserved NFVI resources are more than or equal to the NFVI resources occupied by the to-be-upgraded VNFC. To be specific, the to-be-upgraded VNFC in this application may occupy more than five units, or even nine units of NFVI resources, provided that the NFVI resources occupied by the to-beupgraded VNFC are fewer than the 10 units of NFVI resources provided by the cloud-based platform.

Upgrading a to-be-upgraded VNFC that occupies nine units of NFVI resources is used as example. In this application, a target VNFC may be first created by using the remaining one unit of NFVI resource; a first part of a service carried by a virtual machine in the to-be-upgraded VNFC is migrated to a virtual machine in the target VNFC; an NFVI resource occupied by the virtual machine that carries the first part of the service is released, a first scale-out/up is performed on the target VNFC by using the released NFVI resource; a second part of the service carried by the virtual machine in the to-be-upgraded VNFC is migrated to a virtual machine in a target VNFC obtained after the first scale-out/up; an NFVI resource occupied by the virtual machine that carries the second part of the service is released; the foregoing procedure is repeatedly performed until a ninth part of the service carried by the virtual machine in the to-be-upgraded VNFC is migrated to a virtual machine in a target VNFC obtained after an eighth scale-out/up; then an NFVI resource occupied by the virtual machine that carries the ninth part of the service may be released for a next upgrade of the target VNFC.

It can be learned that, compared with the earlier VNFC in the prior art that can occupy only five units of NFVI resources, the to-be-upgraded VNFC in this application can occupy more than five units of NFVI resources, so that NFVI resource utilization can be improved, a capacity of the to-be-upgraded VNFC can be larger, more services can be carried, and more services can be externally provided.

In this application, when the service carried by the first to-be-migrated virtual machine group is migrated to the target virtual machine and/or the second to-be-migrated virtual machine group, each service carried by the first to-be-migrated virtual machine group may be migrated based on a migration granularity of each service carried by the first to-be-migrated virtual machine group. In addition, when the service carried by the second to-be-migrated virtual machine group is migrated to the target VNFC obtained after the first scale-out/up, each service carried by the second to-be-migrated virtual machine group may be migrated based on a migration granularity of each service carried by the second to-be-migrated virtual machine group.

In this application, the cloud-based platform provides many protocol interfaces, such as a Gr protocol interface, a Gd protocol interface, a Gf protocol interface, a Gs protocol interface, an Lg protocol interface, an S13 protocol interface, an S6a&d protocol interface, an SLg protocol interface, an SLs protocol interface, and an SBC protocol interface.

For a service provided through any one of these protocol interfaces, when the service is migrated from the to-be-upgraded VNFC to the target VNFC, the service in the to-be-upgraded VNFC needs to be migrated from the to-be-upgraded VNFC to the target VNFC at a time; otherwise, if the service is migrated from the to-be-upgraded VNFC to the target VNFC in batches, the service is carried by virtual machines in different VNFCs at some moments, so that neither the to-be-upgraded VNFC nor the target VNFC can completely process the service, and can externally provide normal services for the service. The same is true for a service provided through each of the other protocol interfaces.

In this application, each virtual machine in a VNFC provides many protocol interfaces, such as an S10 protocol interface, an S11 protocol interface, a Gn protocol interface, a Gp protocol interface, an S3 protocol interface, an S4 protocol interface, an S16 protocol interface, an Sv protocol interface, a DNS protocol interface, and a Ga protocol interface.

When a service provided through a protocol interface is migrated from the to-be-upgraded VNFC to the target VNFC, a minimum migration granularity is a virtual machine. Because each virtual machine in the to-be-upgraded VNFC has an IP address, and different virtual machines have different IP addresses, the minimum migration granularity may be an IP address of each virtual machine in the to-be-upgraded VNFC.

For example, for any protocol interface and any virtual machine in the to-be-upgraded VNFC, when a service carried by the virtual machine and provided through the protocol interface is migrated from the to-be-upgraded VNFC to the target VNFC, the service carried by the virtual machine and provided through the protocol interface needs to be migrated from the to-be-upgraded VNFC to the target VNFC at a time. The same is true for each of the other protocol interfaces and each of the other virtual machines in the to-be-upgraded VNFC.

In this application, the cloud-based platform further provides many protocol interfaces, such as a Gb protocol interface, an S1-MME protocol interface, an Iu-C protocol interface, and an SGs protocol interface.

For a service provided through the Gb protocol interface, when the service is migrated from the to-be-upgraded VNFC to the target VNFC, a minimum migration granularity is an NSE (network service entity). For a service provided through the S1-MME protocol interface, when the service is migrated from the to-be-upgraded VNFC to the target VNFC, a minimum migration granularity is a token in an eNodeB (evolved NodeB) context. For a service provided through the Iu-C protocol interface, when the service is migrated from the to-be-upgraded VNFC to the target VNFC, a minimum migration granularity is an RNC (radio network controller). For a service provided through the SGs protocol interface, when the service is migrated from the to-be-upgraded VNFC to the target VNFC, a minimum migration granularity is an MSC (mobile switching center).

In this application, a virtual machine in the to-be-upgraded VNFC usually further includes a plurality of user contexts, and the user contexts are grouped. For example, user contexts in a same virtual machine are in one user context group. When the user contexts are migrated from the to-be-upgraded VNFC to the target VNFC, a minimum migration granularity is a user context group.

Figure 2:
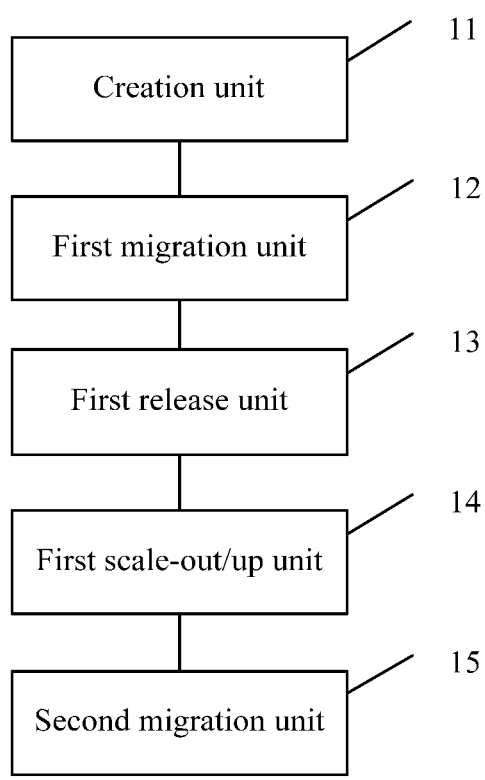
FIG. 2 is a schematic structural diagram of a device upgrade apparatus according to an example embodiment.

FIG. 2 is a schematic structural diagram of a device upgrade apparatus according to an example embodiment. As shown in FIG. 2, the apparatus includes:

a creation unit 11, configured to create a target VNFC by using an initial NFVI resource, where the target VNFC includes at least one target virtual machine, and NFVI resources occupied by the target VNFC are fewer than those occupied by a to-be-upgraded VNFC;

a first migration unit 12, configured to migrate a service carried by a first to-be-migrated virtual machine group to the target virtual machine and/or a second to-be-migrated virtual machine group, where the first to-be-migrated virtual machine group includes some virtual machines in the to-be-upgraded VNFC, and the second to-be-migrated virtual machine group includes a virtual machine in the to-be-upgraded VNFC except the first to-be-migrated virtual machine group;

a first release unit 13, configured to release an NFVI resource occupied by the first to-be-migrated virtual machine group;

a first scale-out/up unit 14, configured to perform a first scale-out/up on the target VNFC by using an NFVI resource in a resource pool, where the resource pool includes an NFVI resource obtained by releasing the first to-be-migrated virtual machine group; and a second migration unit 15, configured to migrate a service carried by the second to-be-migrated virtual machine group to a target VNFC obtained after the first scale-out/up.

In an optional implementation, the first scale-out/up unit 14 includes:

an adding unit, configured to add, to the target VNFC, a new virtual machine created by using the NFVI resource in the resource pool; or a second scale-up unit, configured to expand a capacity of a virtual machine in the target VNFC by using the NFVI resource in the resource pool.

In an optional implementation, the adding unit is specifically configured to add the new virtual machine to the target VNFC, where the new virtual machine is a virtual machine created by using the NFVI resource obtained by releasing the first to-be-migrated virtual machine group.

In an optional implementation, the second scale-up unit is specifically configured to expand the capacity of the virtual machine in the target VNFC by using the NFVI resource obtained by releasing the first to-be-migrated virtual machine group.

In an optional implementation, the second migration unit 15 includes:

a third migration unit, configured to migrate a service carried by an $i^{th}$ virtual machine in the second to-be-migrated virtual machine group to a target VNFC obtained after an $i^{th}$ scale-out/up;

a second release unit, configured to release an NFVI resource occupied by the $i^{th}$ virtual machine;

a third scale-out/up unit, configured to perform an $(i+1)^{th}$ scale-out/up on the target VNFC by using an $(i+1)^{th}$ available NFVI resource, where the $(i+1)^{th}$ available NFVI resource includes an NFVI resource obtained by releasing the $i^{th}$ virtual machine;

a fourth migration unit, configured to migrate a service carried by an $(i+1)^{th}$ virtual machine in the second to-be-migrated virtual machine group to a target VNFC obtained after the $(i+1)^{th}$ scale-out/up; and a third release unit, configured to release an NFVI resource occupied by the $(i+1)^{th}$ virtual machine until all services carried by the second to-be-migrated virtual machine group are migrated to the target VNFC, where i=1, 2, 3, . . . , N−1, N; and N is a quantity of virtual machines included in the second to-be-migrated virtual machine group.

In an optional implementation, the first migration unit 12 is specifically configured to migrate, based on a migration granularity of each service carried by the first to-be-migrated virtual machine group, each service carried by the first to-be-migrated virtual machine group.

In an optional implementation, the second migration unit 15 is specifically configured to:

migrate, based on a migration granularity of each service carried by the second to-be-migrated virtual machine group, each service carried by the second to-be-migrated virtual machine group.

In this application, the target VNFC is first created by using initial NFVI resources, where the initial NFVI resources may be fewer than NFVI resources required for upgrading the to-be-upgraded VNFC, or may be fewer than NFVI resources occupied by the to-be-upgraded VNFC, and the NFVI resources occupied by the target VNFC are fewer than those occupied by the to-be-upgraded VNFC; the service carried by the first to-be-migrated virtual machine group is migrated to a first transit virtual machine, where the first transit virtual machine includes the virtual machine in the target VNFC or a virtual machine in the second to-be-migrated virtual machine group; the NFVI resource occupied by the first to-be-migrated virtual machine group is released; the first scale-out/up is performed on the target VNFC by using a first available NFVI resource, where the first available NFVI resource may include the NFVI resource obtained by releasing the first to-be-migrated virtual machine group; and the service carried by the second to-be-migrated virtual machine group is migrated to the target VNFC obtained after the first scale-out/up.

In this application, both NFVI resources used to create the target VNFC and NFVI resources used to scale out/up the target VNFC are fewer than those occupied by the to-be-upgraded VNFC; or both the NFVI resources used to create the target VNFC and the NFVI resources used to scale out/up the target VNFC are fewer than those required for upgrading the to-be-upgraded VNFC. Therefore, in this application, a same quantity of NFVI resources as those occupied by the to-be-upgraded VNFC do not need to be reserved in NFVI resources provided by a cloud-based platform, to upgrade the to-be-upgraded NFVC, and only NFVI resources fewer than those occupied by the to-be-upgraded VNFC need to be reserved to upgrade the to-be-upgraded NFVC, so that more NFVI resources provided by the cloud-based platform can be used to scale out/up the to-be-upgraded VNFC, the virtual machine in the to-be-upgraded VNFC can carry more services to externally provide more services, and NFVI resource utilization is improved.

An embodiment of the present disclosure further shows a computer-readable storage medium, including an instruction. When the instruction runs on a computer, the computer is enabled to perform the device upgrade method shown in FIG. 1.

An embodiment of the present disclosure further shows a computer program product. When the computer program product runs on a computer, the computer is enabled to perform the device upgrade method shown in FIG. 1.

An embodiment of the present disclosure further shows a device, including a memory, a processor, and a computer program that is stored in the memory and that can run on the processor. When executing the program, the processor implements the device upgrade method shown in FIG. 1.

The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments.

Based on the foregoing descriptions of the implementations, a person skilled in the art may clearly understand that each implementation may be implemented by software in addition to a general hardware platform or by hardware. Based on such an understanding, the foregoing technical solutions essentially or the part contributing to the related art may be implemented in a form of a software product. The computer software product may be stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

A person skilled in the art can easily figure out another implementation solution of the present disclosure after considering the specification and practicing the present disclosure that is disclosed herein. This application is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the embodiments are merely considered as examples, and the actual scope of the present disclosure are pointed out by the appended claims.

It should be understood that the present disclosure is not limited to the accurate structures that are described in the foregoing and that are shown in the accompanying drawings, and modifications and changes may be made without departing from the scope of the present disclosure. The scope of the present disclosure is limited only by the appended claims.

What is claimed is:

1. A device upgrade method, wherein the method comprises:
creating a target VNFC (virtualised network function component) by using an initial NFVI (network functions virtualisation infrastructure) resource, wherein the target VNFC comprises at least one target virtual machine, and NFVI resources occupied by the target VNFC are fewer than those occupied by a to-be-upgraded VNFC;
migrating a service carried by a first to-be-migrated virtual machine group to the target virtual machine or a second to-be-migrated virtual machine group, wherein the first to-be-migrated virtual machine group comprises some virtual machines in the to-be-upgraded VNFC, and the second to-be-migrated virtual machine group comprises a virtual machine in the to-be-upgraded VNFC except the first to-be-migrated virtual machine group;
releasing an NFVI resource occupied by the first to-be-migrated virtual machine group;
performing a first scale-out/up on the target VNFC by using an NFVI resource in a resource pool, wherein the resource pool comprises the NFVI resource obtained by releasing the first to-be-migrated virtual machine group; and
migrating a service carried by the second to-be-migrated virtual machine group to the target VNFC obtained after the first scale-out/up,
wherein the device upgrade method does not require that reserved NFVI resources are more than or equal to the NFVI resources occupied by the to-be-upgraded VNFC, and
wherein the migrating the service carried by the second to-be-migrated virtual machine group to the target VNFC obtained after the first scale-out/up comprises:
migrating the service carried by an $i^{th}$ virtual machine in the second to-be-migrated virtual machine group to the target VNFC obtained after an $i^{th}$ scale-out/up;
releasing the NFVI resource occupied by the $i^{th}$ virtual machine;
performing an $(i+1)^{th}$ scale-out/up on the target VNFC by using an $(i+1)^{th}$ available NFVI resource, wherein the $(i+1)^{th}$ available NFVI resource comprises the NFVI resource obtained by releasing the $i^{th}$ virtual machine;
migrating the service carried by an $(i+1)^{th}$ virtual machine in the second to-be-migrated virtual machine group to the target VNFC obtained after the $(i+1)^{th}$ scale-out/up; and
releasing the NFVI resource occupied by the $(i+1)^{th}$ virtual machine until all services carried by the second to-be-migrated virtual machine group are migrated to the target VNFC, wherein i=1, 2, 3, . . . , N−1, N; and N is a quantity of virtual machines comprised in the second to-be-migrated virtual machine group.

2. The method according to claim 1, wherein the performing the first scale-out/up on the target VNFC by using the NFVI resource in the resource pool comprises:
adding, to the target VNFC, a new virtual machine created by using the NFVI resource in the resource pool; or
expanding a capacity of a virtual machine in the target VNFC by using the NFVI resource in the resource pool.

3. The method according to claim 2, wherein the adding, to the target VNFC, the new virtual machine created by using the NFVI resource in the resource pool comprises:
adding the new virtual machine to the target VNFC, wherein the new virtual machine is a virtual machine created by using the NFVI resource obtained by releasing the first to-be-migrated virtual machine group.

4. The method according to claim 2, wherein the expanding the capacity of the virtual machine in the target VNFC by using the NFVI resource in the resource pool comprises:
expanding the capacity of the virtual machine in the target VNFC by using the NFVI resource obtained by releasing the first to-be-migrated virtual machine group.

5. The method according to claim 1, wherein the migrating the service carried by the first to-be-migrated virtual machine group to the target virtual machine or the second to-be-migrated virtual machine group comprises:
migrating, based on a predefined condition of each service carried by the first to-be-migrated virtual machine group, each service carried by the first to-be-migrated virtual machine group.

6. The method according to claim 1, wherein the migrating the service carried by the second to-be-migrated virtual machine group to the target VNFC obtained after the first scale-out/up comprises:
migrating, based on a predefined condition of each service carried by the second to-be-migrated virtual machine group, each service carried by the second to-be-migrated virtual machine group.

7. A non-transitory computer-readable storage medium, comprising an instruction, wherein when the instruction runs on a computer, the computer is enabled to perform the following:
creating a target VNFC (virtualised network function component) by using an initial NFVI (network functions virtualisation infrastructure) resource, wherein the target VNFC comprises at least one target virtual machine, and NFVI resources occupied by the target VNFC are fewer than those occupied by a to-be-upgraded VNFC;
migrating a service carried by a first to-be-migrated virtual machine group to the target virtual machine or a second to-be-migrated virtual machine group, wherein the first to-be-migrated virtual machine group comprises some virtual machines in the to-be-upgraded VNFC, and the second to-be-migrated virtual machine group comprises a virtual machine in the to-be-upgraded VNFC except the first to-be-migrated virtual machine group;

releasing an NFVI resource occupied by the first to-be-migrated virtual machine group;

performing a first scale-out/up on the target VNFC by using an NFVI resource in a resource pool, wherein the resource pool comprises the NFVI resource obtained by releasing the first to-be-migrated virtual machine group; and migrating a service carried by the second to-be-migrated virtual machine group to the target VNFC obtained after the first scale-out/up, wherein the computer is not configured to require that reserved NFVI resources are more than or equal to the NFVI resources occupied by the to-be-upgraded VNFC, wherein the migrating the service carried by the second to-be-migrated virtual machine group to the target VNFC obtained after the first scale-out/up comprises:

migrating the service carried by an $i^{th}$ virtual machine in the second to-be-migrated virtual machine group to the target VNFC obtained after an $i^{th}$ scale-out/up;

releasing the NFVI resource occupied by the $i^{th}$ virtual machine;

performing an $(i+1)^{th}$ scale-out/up on the target VNFC by using an $(i+1)^{th}$ available NFVI resource, wherein the $(i+1)^{th}$ available NFVI resource comprises the NFVI resource obtained by releasing the $i^{th}$ virtual machine;

migrating the service carried by an $(i+1)^{th}$ virtual machine in the second to-be-migrated virtual machine group to the target VNFC obtained after the $(i+1)^{th}$ scale-out/up; and releasing the NFVI resource occupied by the $(i+1)^{th}$ virtual machine until all services carried by the second to-be-migrated virtual machine group are migrated to the target VNFC, wherein i=1, 2, 3, . . . , N−1, N; and N is a quantity of virtual machines comprised in the second to-be-migrated virtual machine group.

8. The non-transitory computer-readable storage medium according to claim 7, wherein the performing the first scale-out/up on the target VNFC by using the NFVI resource in the resource pool comprises:

adding, to the target VNFC, a new virtual machine created by using the NFVI resource in the resource pool; or expanding a capacity of a virtual machine in the target VNFC by using the NFVI resource in the resource pool.

9. The non-transitory computer-readable storage medium according to claim 8, wherein the adding, to the target VNFC, the new virtual machine created by using the NFVI resource in the resource pool comprises:

adding the new virtual machine to the target VNFC, wherein the new virtual machine is a virtual machine created by using the NFVI resource obtained by releasing the first to-be-migrated virtual machine group.

10. The non-transitory computer-readable storage medium according to claim 8, wherein the expanding the capacity of the virtual machine in the target VNFC by using the NFVI resource in the resource pool comprises:

expanding the capacity of the virtual machine in the target VNFC by using the NFVI resource obtained by releasing the first to-be-migrated virtual machine group.

11. The non-transitory computer-readable storage medium according to claim 7, wherein the migrating the service carried by the first to-be-migrated virtual machine group to the target virtual machine or the second to-be-migrated virtual machine group comprises:

migrating, based on a predefined condition of each service carried by the first to-be-migrated virtual machine group, each service carried by the first to-be-migrated virtual machine group.

12. The non-transitory computer-readable storage medium according to claim 7, wherein the migrating the service carried by the second to-be-migrated virtual machine group to the target VNFC obtained after the first scale-out/up comprises:

migrating, based on a predefined condition of each service carried by the second to-be-migrated virtual machine group, each service carried by the second to-be-migrated virtual machine group.

13. A device, comprising a memory, a processor, and a computer program that is stored in the memory and that can run on the processor, wherein when executing the program, the processor implements the following method:

creating a target VNFC (virtualised network function component) by using an initial NFVI (network functions virtualisation infrastructure) resource, wherein the target VNFC comprises at least one target virtual machine, and NFVI resources occupied by the target VNFC are fewer than those occupied by a to-be-upgraded VNFC;

migrating a service carried by a first to-be-migrated virtual machine group to the target virtual machine or a second to-be-migrated virtual machine group, wherein the first to-be-migrated virtual machine group comprises some virtual machines in the to-be-upgraded VNFC, and the second to-be-migrated virtual machine group comprises a virtual machine in the to-be-upgraded VNFC except the first to-be-migrated virtual machine group;

releasing an NFVI resource occupied by the first to-be-migrated virtual machine group;

performing a first scale-out/up on the target VNFC by using an NFVI resource in a resource pool, wherein the resource pool comprises the NFVI resource obtained by releasing the first to-be-migrated virtual machine group; and migrating a service carried by the second to-be-migrated virtual machine group to the target VNFC obtained after the first scale-out/up, wherein the processor is not configured to require that reserved NFVI resources are more than or equal to the NFVI resources occupied by the to-be-upgraded VNFC, and wherein the migrating the service carried by the second to-be-migrated virtual machine group to the target VNFC obtained after the first scale-out/up comprises:

migrating the service carried by an $i^{th}$ virtual machine in the second to-be-migrated virtual machine group to the target VNFC obtained after an $i^{th}$ scale-out/up;

releasing the NFVI resource occupied by the $i^{th}$ virtual machine;

performing an $(i+1)^{th}$ scale-out/up on the target VNFC by using an $(i+1)^{th}$ available NFVI resource, wherein the $(i+1)^{th}$ available NFVI resource comprises the NFVI resource obtained by releasing the $i^{th}$ virtual machine;

migrating the service carried by an $(i+1)^{th}$ virtual machine in the second to-be-migrated virtual machine group to the target VNFC obtained after the $(i+1)^{th}$ scale-out/up; and releasing the NFVI resource occupied by the $(i+1)^{th}$ virtual machine until all services carried by the second to-be-migrated virtual machine group are migrated to the target VNFC, wherein i=1, 2, 3, . . . , N−1, N; and N is a quantity of virtual machines comprised in the second to-be-migrated virtual machine group.

14. The device according to claim 13, wherein the performing the first scale-out/up on the target VNFC by using the NFVI resource in the resource pool comprises:
    adding, to the target VNFC, a new virtual machine created by using the NFVI resource in the resource pool; or
    expanding a capacity of a virtual machine in the target VNFC by using the NFVI resource in the resource pool.

15. The device according to claim 14, wherein the adding, to the target VNFC, the new virtual machine created by using the NFVI resource in the resource pool comprises:
    adding the new virtual machine to the target VNFC, wherein the new virtual machine is a virtual machine created by using the NFVI resource obtained by releasing the first to-be-migrated virtual machine group.

16. The device according to claim 14, wherein the expanding the capacity of the virtual machine in the target VNFC by using the NFVI resource in the resource pool comprises:
    expanding the capacity of the virtual machine in the target VNFC by using the NFVI resource obtained by releasing the first to-be-migrated virtual machine group.

17. The device according to claim 13, wherein the migrating the service carried by the first to-be-migrated virtual machine group to the target virtual machine or the second to-be-migrated virtual machine group comprises:
    migrating, based on a predefined condition of each service carried by the first to-be-migrated virtual machine group, each service carried by the first to-be-migrated virtual machine group.

\* \* \* \* \*